UNITED STATES PATENT OFFICE.

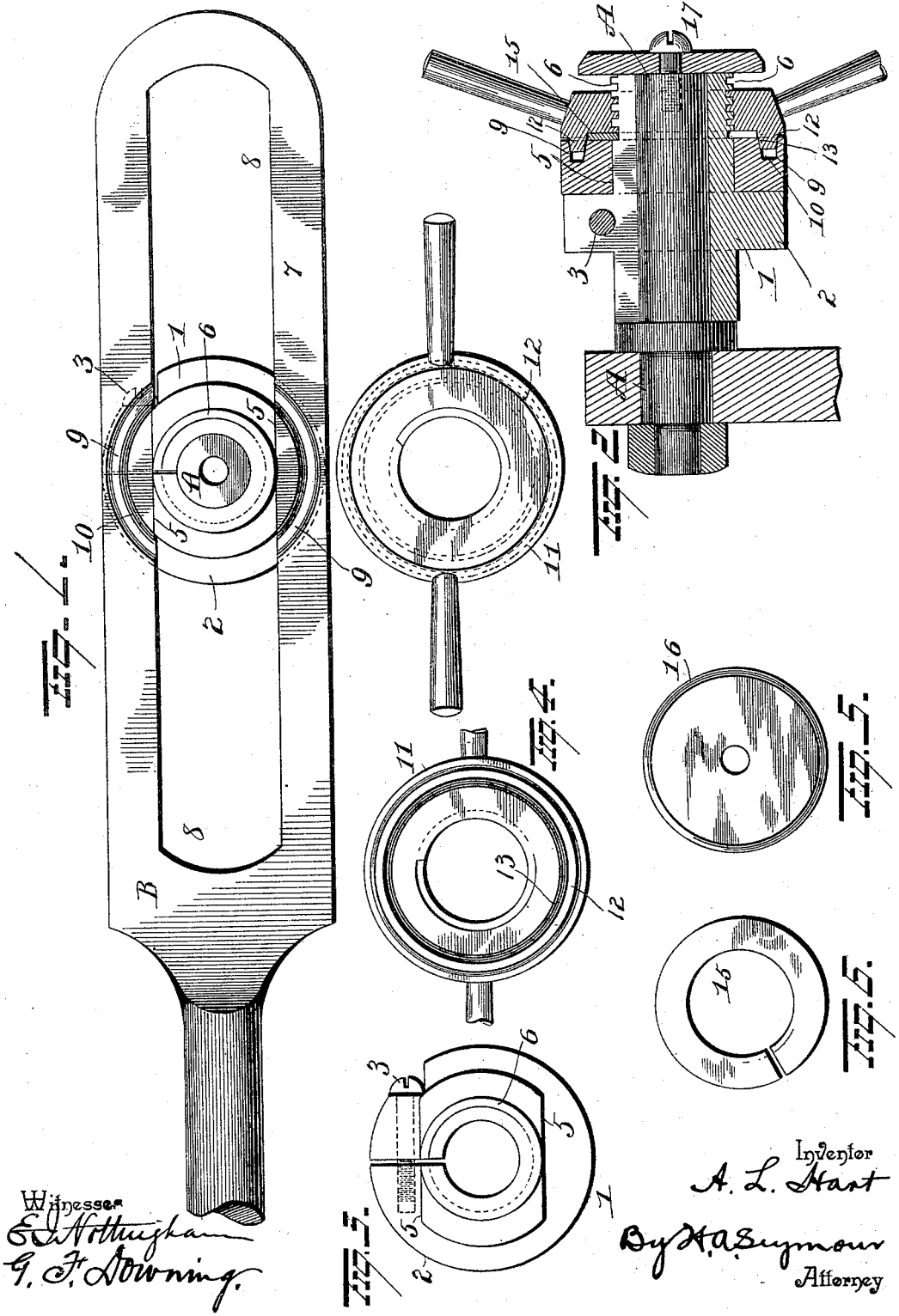

ALVAN L. HART, OF BURLINGTON, IOWA.

ROD CONNECTION FOR WRIST-PLATES.

SPECIFICATION forming part of Letters Patent No. 584,351, dated June 15, 1897.

Application filed March 26, 1897. Serial No. 629,429. (No model.)

*To all whom it may concern:*

Be it known that I, ALVAN L. HART, a resident of Burlington, in the county of Des Moines and State of Iowa, have invented certain new and useful Improvements in Rod Connections for Wrist Plates or Disks; and I do hereby declare the following to be a full, clear, and exact description of the invention, such as will enable others skilled in the art to which it appertains to make and use the same.

My invention relates to an improvement in rod connections for the wrist-plates of Corliss engines, the object being to provide a simple, light, and inexpensive connection which can be readily disconnected and otherwise conveniently manipulated; and it consists in certain novel features of construction and combinations of parts, which will be hereinafter described, and pointed out in the claims.

In the accompanying drawings, Figure 1 is a view in side elevation with the clamp-nut removed. Fig. 2 is a sectional view, and Figs. 3, 4, 5, and 6 are views showing the several parts disconnected.

A represents the wrist-pin. This is attached to the wrist plate or disk in the usual manner. On this pin is loosely mounted the split brass 1. This brass is constructed with the enlarged circumferential shoulder 2, and a cap-screw 3, extending through one end of this shoulder into the other, is manipulated to take up wear in the brass or bearing. The outer end or hub of the brass is flattened on each side, as at 5 5, adjacent to the annular shoulder. The extreme outer end of the brass is provided with screw-thread 6.

B is the reciprocating rod which imparts motion to the wrist plate or disk. This rod is flattened at its outer end 7 and provided with an elongated slot 8 with parallel sides, which receives the brass and fits snugly against the flattened sides 5 5 of the brass. This rod is uniform in thickness and dimensions on its two edges, so that it can readily be adapted to a right or left hand engine.

A pair of curved grooves 9 9 are formed in the flattened end 7 of the rod at diametrically opposite points. These grooves 9 9 open into the slot 8. The inner wall 10 of each groove is tapered, gradually thickening from the outer end inward. The nut 11 is furnished with an annular flange 12 on its inner face, and the inside edge 13 of this flange is beveled. This nut is adapted to be screwed upon the outer threaded end 6 of the brass, and the annular flange 12 enters the grooves 9 9, which are somewhat deeper than the flange, and the inclinations of the face 13 on the flange and of the walls 10 10 of the grooves is such that when the nut is screwed up tight the rod and brass are clamped together rigidly, as if in a vise, the flange 12 closing around the hub, thus absolutely preventing any movement between the parts.

Between the screw-threads 6 and the hub a split washer 15 is placed, its function being to guard and protect the rod from working outward from shoulder 2 when for any reason the parts are loosened and the wrist-plate is to be turned independently of the rod. This washer is so formed and constructed that it may be turned on the threads 6 after the manner of a nut. A washer 16 is held by a screw 17 on the outer end of the wrist-pin, and the length of the threads 6 between this washer and the split washer 15 is sufficient to permit the nut 11 to be turned until the flange 12 recedes from the grooves 9 9 to provide for this sliding action between the pin and rod referred to hereinbefore.

From the foregoing it will be observed that the parts can be quickly clamped together by hand and as readily unclamped when necessary. Moreover, wear can be taken up and compensated for by turning the cap-screw 3 without interfering in the slightest degree with any other part of the engine. Likewise the entire mechanism can be taken apart and any part removed or renewed in a comparatively short time and without the use of tools except possibly a screw-driver.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with a reciprocating rod, and wrist-pin, of a split brass or bearing on the pin and adapted to enter an opening in the rod, and means for tightening this brass or bearing around the pin.

2. The combination with a wrist-pin, of a reciprocating rod having an elongated opening therein to receive the pin, and means carried by the pin for clamping the rod movably upon the pin.

3. The combination with a wrist-pin, of a reciprocating rod, a bearing upon the pin which enters an opening in the rod, and means carried by the pin for clamping the bar upon the bearing.

4. The combination with a wrist-pin, and brass or bearing, of a reciprocating rod having an elongated slot in one end which receives the bearing on the pin, and provided with curved grooves at opposite points opening into the slot, and a nut constructed to screw upon the brass or bearing and provided with a flange which enters the grooves and embraces the hub of the bearing or brass.

5. The combination with a wrist-pin, and bearing thereon having a threaded outer end, of a reciprocating rod, having an elongated slot therein adapted to receive the bearing, and provided with two curved grooves oppositely located and opening into the slot, one wall of each groove tapering and a nut having an annular flange one face of which is beveled, said flange adapted to enter the grooves and encircle the hub of the bearing, the beveled face of the flange engaging the inclining walls of the grooves whereby when the nut is screwed on the threads of the bearing the parts are all clamped securely together.

6. The combination with a wrist-pin, and a brass or bearing the hub of which is flattened at diametrically opposite points, of a reciprocating rod having an elongated slot in one end which receives the hub of the bearing and the sides of which fit the flattened sides of the hub and a nut adapted to screw on the outer end of the bearing and having an annular flange which embraces the hub of the bearing and clamps it to the rod.

7. The combination with a wrist-pin, and a bearing having a threaded outer end, of a reciprocating rod provided with a slot which receives the bearing, a guard-washer adapted to enter between the screw-threads and the hub, and a nut adapted to screw on the threads of the bearing.

8. The combination with a wrist-pin, and a reciprocating rod having an elongated slot therein, of a bearing or brass having shoulder thereon and its hub flattened at opposite sides to enter and fit the slot, and a clamp-nut constructed and adapted to clamp the rod to the bearing or brass.

In testimony whereof I have signed this specification in the presence of two subscribing witnesses.

ALVAN L. HART.

Witnesses:
   JNO. J. SEERLEY,
   CHAS. C. CLARK.